(12) United States Patent
Jebbar et al.

(10) Patent No.: US 10,698,801 B2
(45) Date of Patent: Jun. 30, 2020

(54) METHOD AND SYSTEM FOR EVALUATING UPGRADE CAMPAIGNS

(71) Applicant: Telefonaktiebolaget LM Ericsson (publ), Stockholm (SE)

(72) Inventors: Oussama Jebbar, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/302,908

(22) PCT Filed: Dec. 15, 2016

(86) PCT No.: PCT/IB2016/057680
§ 371 (c)(1),
(2) Date: Nov. 19, 2018

(87) PCT Pub. No.: WO2017/199076
PCT Pub. Date: Nov. 23, 2017

(65) Prior Publication Data
US 2019/0278692 A1   Sep. 12, 2019

Related U.S. Application Data

(60) Provisional application No. 62/338,587, filed on May 19, 2016.

(51) Int. Cl.
*G06F 11/36* (2006.01)
*G06F 8/65* (2018.01)
(Continued)

(52) U.S. Cl.
CPC ............. *G06F 11/368* (2013.01); *G06F 8/65* (2013.01); *G06F 9/44505* (2013.01);
(Continued)

(58) Field of Classification Search
CPC .... G06F 8/60–66; G06F 8/65; G06F 11/3419; G06F 11/3612; G06F 11/368; G06F 11/3692; G06F 9/44505
See application file for complete search history.

(56) References Cited

U.S. PATENT DOCUMENTS

| 9,032,388 B1* | 5/2015 | Watson | G06F 21/57 |
| | | | 717/170 |
| 2006/0070058 A1* | 3/2006 | Menahemi | H04L 12/42 |
| | | | 717/171 |

(Continued)

FOREIGN PATENT DOCUMENTS

| GB | 2488006 A | 8/2012 |
| KR | 20130064265 A * | 6/2013 |

*Primary Examiner* — S. Sough
*Assistant Examiner* — Stephen D Berman
(74) *Attorney, Agent, or Firm* — Sage Patent Group

(57) ABSTRACT

An upgrade campaign specification upgrades a system from a current configuration to a target configuration. A method is provided for selecting one or more upgrade campaign specifications from a given set of upgrade campaign specifications. For each upgrade campaign specification, the method (1) identifies software and management operations specified in the upgrade campaign specification for upgrading the system; and (2) for each of a set of one or more scenarios defined in terms of operation execution time selection and execution mode, simulates upgrade of the system according to a corresponding arrangement of the software and management operations, thereby obtaining a corresponding execution time and a corresponding outage. A subset of the upgrade campaign specifications is rejected, for which the corresponding execution times do not meet an execution time threshold or for which the corresponding outages do not meet an outage threshold.

20 Claims, 10 Drawing Sheets

(51) Int. Cl.
*G06F 9/445* (2018.01)
*G06F 11/34* (2006.01)
(52) U.S. Cl.
CPC ...... *G06F 11/3419* (2013.01); *G06F 11/3612* (2013.01); *G06F 11/3692* (2013.01)

(56) References Cited

U.S. PATENT DOCUMENTS

| | | | | |
|---|---|---|---|---|
| 2008/0320109 | A1* | 12/2008 | Andrews | G06F 8/65 709/220 |
| 2013/0055155 | A1* | 2/2013 | Wong | G06F 8/65 715/810 |
| 2014/0258999 | A1* | 9/2014 | Katihar | G06F 8/65 717/168 |
| 2016/0191342 | A1* | 6/2016 | Kannan | H04L 41/5025 709/226 |
| 2017/0068588 | A1* | 3/2017 | Pourali | H04L 41/0836 |

* cited by examiner

METHOD AND SYSTEM FOR EVALUATING UPGRADE CAMPAIGNS

CROSS-REFERENCE TO RELATED APPLICATIONS TECHNICAL FIELD

This application claims the benefit of U.S. Provisional Application No. 62/338,587 filed on May 19, 2016.

TECHNICAL FIELD

Embodiments of the disclosure relate to software management for highly available systems.

BACKGROUND

High availability (HA) is an important requirement for carrier grade services. The Service Availability Forum (SAF) developed a set of standard services for an HA enabling middleware. Among these services, the Availability Management Framework (AMF) is responsible for managing application/service availability, while the Software Management Framework (SMF) is in charge of orchestrating upgrade campaigns that perform changes on these applications.

An upgrade campaign is the process of migrating a system from its current configuration to a target configuration that, for example, deploys a new version of some software. In a Service Availability Forum (SAF) compliant environment, SMF orchestrates this migration by following a roadmap: an upgrade campaign specification, which describes the changes to be done and their ordering. An upgrade campaign specification describes the actions to initialize and to wrap up the campaign, and the upgrade procedures that compose the body of the campaign. Each procedure has an upgrade scope, an upgrade method, and the common attributes of the steps composing this procedure. Based on the upgrade scope, the upgrade method and the state of the current system configuration, at execution time, SMF decomposes each procedure into a number of upgrade steps. Each step has a sequence of actions, some of which are performed online while the service is being provided, while others are performed offline by taking a subset of the service providers out of service while upgrading them. The later may induce some service outage.

Several upgrade campaign specifications might be applicable to take a system from a source configuration to a target configuration. These upgrade campaign specifications have in common the set of changes they have to perform, but they vary in other aspects such as the number of procedures, the ordering of the procedures, or even the choice of the scope and upgrade method of each procedure. Therefore, some upgrade campaign specifications may induce more outage or may take longer time to execute than others.

SUMMARY

In one embodiment, there is provided a method for selecting one or more upgrade campaign specifications from a given set of upgrade campaign specifications which upgrade a system from a current configuration to a target configuration. The method comprises: (a) for each upgrade campaign specification: identifying software and management operations specified in the upgrade campaign specification for upgrading the system; and for each of a set of one or more scenarios defined in terms of operation execution time selection and execution mode, simulating upgrade of the system according to a corresponding arrangement of the software and management operations, thereby obtaining a corresponding execution time and a corresponding outage. The method further comprises: (b) rejecting a subset of the upgrade campaign specifications for which the corresponding execution times do not meet an execution time threshold or for which the corresponding outages do not meet an outage threshold.

In another embodiment, there is provided a network node comprising processing circuitry and memory. The memory contains instructions executable by the processing circuitry to select one or more upgrade campaign specifications from a given set of upgrade campaign specifications which upgrade a system from a current configuration to a target configuration. The network node is operative to: (a) for each upgrade campaign specification: identify software and management operations specified in the upgrade campaign specification for upgrading the system; and for each of a set of one or more scenarios defined in terms of operation execution time selection and execution mode, simulate upgrade of the system according to a corresponding arrangement of the software and management operations, thereby obtaining a corresponding execution time and a corresponding outage. The network node is further operative to: (b) reject a subset of the upgrade campaign specifications for which the corresponding execution times do not meet an execution time threshold or for which the corresponding outages do not meet an outage threshold.

In yet another embodiment, there is provided a network node operable to select one or more upgrade campaign specifications from a given set of upgrade campaign specifications which upgrade a system from a current configuration to a target configuration. The network node comprises: an identification module adapted to identify, for each upgrade campaign specification, software and management operations specified in the upgrade campaign specification for upgrading the system; a simulation module adapted to simulate, for each upgrade campaign specification and for each of a set of one or more scenarios defined in terms of operation execution time selection and execution mode, upgrade of the system according to a corresponding arrangement of the software and management operations, thereby obtaining a corresponding execution time and a corresponding outage; and a rejection module adapted to reject a subset of the upgrade campaign specifications for which the corresponding execution times do not meet an execution time threshold or for which the corresponding outages do not meet an outage threshold.

In another embodiment there is provided a method for selecting one or more upgrade campaign specifications from a given set of upgrade campaign specifications which upgrade a system from a current configuration to a target configuration. The method comprises initiating an instantiation of a server instance in a cloud computing environment which provides processing circuitry and memory for running the server instance. The server instance is operative to: (a) for each upgrade campaign specification: identify software and management operations specified in the upgrade campaign specification for upgrading the system; and for each of a set of one or more scenarios defined in terms of operation execution time selection and execution mode, simulate upgrade of the system according to a corresponding arrangement of the software and management operations, thereby obtaining a corresponding execution time and a corresponding outage. The server instance is further operative to: (b) reject a subset of the upgrade campaign specifications for which the corresponding execution times do not meet an execution time threshold or for which the corresponding outages do not meet an outage threshold.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DETAILED DESCRIPTION

Figure 1:
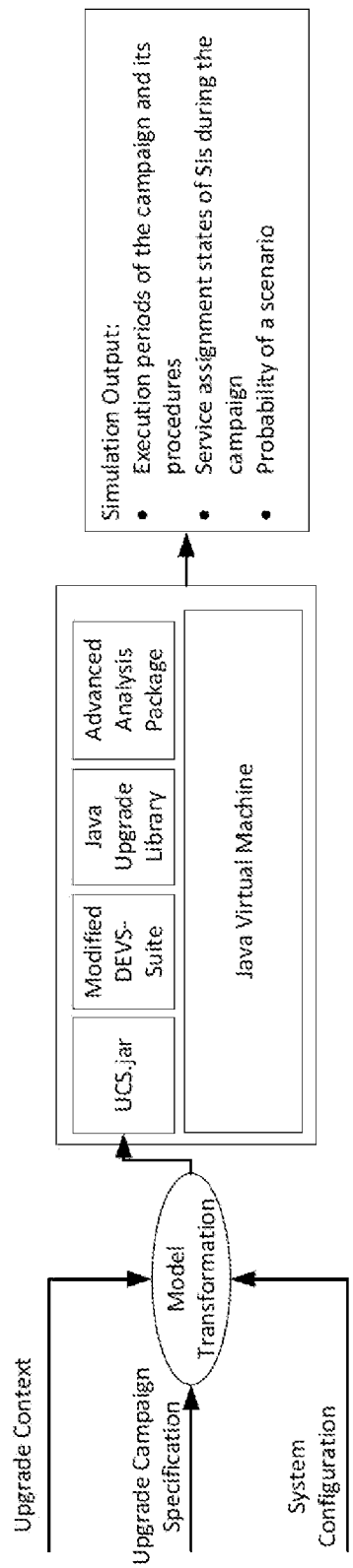
FIG. 1 illustrates a simulation and evaluation framework of upgrade campaign specifications according to one embodiment.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

Embodiments of the invention provide a method and system for selecting one or more upgrade campaign specifications from a given set of upgrade campaign specifications. In order to select one upgrade campaign over another, one has to consider every behavior that may take place in the system during the execution of that upgrade campaign. This includes the behavior of SMF executing the upgrade steps, the upgrade procedures and the upgrade campaign on one hand; and the behavior of AMF with respect to the system entities represented by the configuration objects which are the targets of the upgrade campaign and whose availability is managed by AMF on the other hand. Thus, making this decision is not a straight forward task, and it gets even harder with the systems getting bigger and more complex.

The embodiments described herein provide a simulation based approach for the evaluation of upgrade campaign specifications. The approach is based on the Discrete EVent System Specification (DEVS) formalism to model the upgrade campaign specifications and their execution environment, and the DEVS-Suite simulator to perform the simulation and evaluation. To compare upgrade campaign specifications from the perspectives of both induced outage and execution time, specific scenarios of best and worst cases are targeted for each upgrade campaign specification. Simulating an upgrade campaign specification in both of these scenarios can provide an insight to the administrator in what to expect as well as the applicability of an upgrade campaign specification within a maintenance window.

The best and the worst case scenarios are defined for fully and partially ordered execution of upgrade campaign specifications. Based on these definitions, the service outage and the execution time can be obtained for these scenarios for every upgrade campaign specification. The execution time and service outage can be compared with the targeted maintenance window and eligible service outage, if any. Recommendations can be made as to whether an upgrade campaign may be modified to meet the requirements of maintenance window and service outage.

Before describing the method and system for selecting one or more upgrade campaign specification, it is useful to explain relevant concepts in an SAF compliant environment including AMF and SMF. It should be understood, however, that the simulation and evaluation framework described hereinafter has broad applicability and is not limited to an SAF compliant environment. For example, the simulation and evaluation framework may also be applicable to the domain of Network Function Virtualization (NFV). The roles of AMF and SMF may be fulfilled by the different parts of Management and Orchestration functions (e.g. Virtual Network Function Manager, Network Function Virtualization Orchestrator, Virtual Infrastructure Management).

AMF manages service provider resources according to a configuration that specifies the configuration objects describing the entities of the system and their relations. The smallest building block of this configuration is a component, which represents a resource such as the execution of software. Each component can provide one or more basic service called Component Service Instance (CSI). A set of components form a Service Unit (SU) to provide a Service Instance (SI), which is an aggregation of CSIs provided by the components of this SU. To ensure service availability, redundant SUs that can provide the same SIs are grouped into a Service Group (SG). To provide the services that an SI represents, at runtime AMF assigns the SI to some SUs of the protecting SG. If an assigned SU is unable to provide the service AMF instructs another SU of the same SG to take over. An SG is usually deployed on a subset of the nodes composing the cluster. All this information regarding the components, CSIs, SIs, SUs and SGs is provided to AMF as a configuration. The dynamic runtime state of the system is captured through a set of attributes. The attributes capture, among others, the different phases of the component life cycle (presence state), the eligibility of an SU to provide the service (administrative state), and SI provisioning levels (assignment state). The state of every entity in the configuration impacts the state of its parent and vice-versa. These states follow the state model described using Finite State Machines (FSM) in the SAF AMF specification. A relevant state for evaluating upgrade campaign specifications is the SI assignment state, which can be fully assigned, partially assigned, or unassigned. A service is considered to be interrupted when the representing SI is in the unassigned assignment state. In this disclosure, an SAF system refers to a system whose service availability is managed by an implementation of the SAF AMF specification.

SMF has been introduced for managing the software in an SAF system. SMF covers two parts: (1) Software delivery, which describes how software bundles are delivered to an SAF system. Every software bundle is accompanied by the Entity Types File (ETF) that serves as a manifest describing the component types and other entity types that the bundle delivers and the service types they can provide. ETF files are usually provided by the software vendors, and contain data about how components of a given type are to be deployed. (2) Software deployment, which describes how an upgrade campaign is to be specified and how it is executed to deploy a set of configuration changes. In SAF systems, these changes are performed by an SMF engine based on the content of an upgrade campaign specification file. The changes are distributed over a set of partially ordered procedures. Each procedure section specifies an upgrade method (e.g., rolling upgrade or single step upgrade), and the upgrade scope which consists of the set of configuration objects representing entities in the system on which the procedure will act. When an SMF engine is given such a file, it executes the upgrade campaign and the specified upgrade procedures as they apply to the current state of the system. More specifically, each procedure is divided into upgrade steps depending on its upgrade method and on the mapping of its scope to the configuration of the SAF system. The behavior associated with the upgrade steps, upgrade procedures and upgrade campaigns can be described using FSMs. These upgrade steps, upgrade procedures and upgrade campaigns are represented in the SMF information model as upgrade objects. To realize the changes, the SMF engine performs upgrade actions, such as software installation/removal, interactions with AMF and configuration modifications. As part of performing the upgrade actions, SMF may order AMF to lock and restart a set of components, a set of SUs, or even a set of nodes depending on the upgrade scope of the upgrade step in question. These actions are the main cause of service outage induced by a given upgrade campaign.

The disclosure also refers to the DEVS, which is a formalism proposed by Bernard P. Zeigler in 1976. It is commonly used for discrete event system modeling and analysis. A DEVS model can be atomic to capture the behavior of a component, or coupled to capture the structure of a system and the components composing it. A system in DEVS can interact with its environment through input and output events, leading to a transition from one state to another. A DEVS model may also generate an output or state change without any interaction with its environment when time spent in a state has elapsed as per the definition of the system. Several simulators have been built for DEVS, including DEVSJAVA, which is part of the DEVS-Suite project, a project led by Arizona State University.

FIG. 1 illustrates the simulation and evaluation framework of upgrade campaign specifications according to one embodiment. The simulation takes the following inputs:

(1) Upgrade campaign specification file: it describes the campaign to be executed. This description of the campaign allows the simulation framework to decompose properly the procedures on one hand, and run the appropriate behavior for each instantiated upgrade object based on its specified attributes on the other hand.

(2) System configuration: The current system configuration of the SAF system to be upgraded provides the information required to properly instantiate and simulate the configuration objects and how these objects relate to each other. These relations can be either dependencies between services or lifecycle dependencies between components as defined in the AMF specification.

(3) Upgrade context: It includes the set of ETF files describing the upper and lower bounds for the durations of operations of the component types in the configuration. The simulation also needs some additional information such as the failure rates of the component types and their lifecycle operations, the failure rates of software operations (installation/removal), as well as the durations of node startup and shutdown operations.

From the aforementioned input using a model transformation, a Java class is created for a coupled DEVS model that contains a description of the upgrade campaigns runtime environment. This Java class is packaged into a jar (UCS.jar) and loaded into the simulation framework. In one embodiment, the simulation environment is composed at least of:

Modified-DEVS-Suite: An extended version of the DEVS-Suite simulator. The extensions to DEVS formalism and Suite simulator are described in the next subsection.

Java Upgrade Library: This library defines the structure and the behavior of the DEVS atomic models used to simulate the configuration and upgrade objects involved in the campaign execution. The transformation only instantiates the concepts defined in the library and combines them into a DEVS coupled model (UCS.java). The actual behavior that drives the simulation is implemented at the level of every concept defined in this library, and it implements the description provided in the SAF standards.

Advanced Analysis Package: the best case and the worst case scenarios for fully ordered execution (i.e., sequential execution) and partially ordered execution (i.e., parallel execution) are defined.

Using the simulation one can have an insight into the following aspects of the campaign:

(1) The execution time of the campaign and each of its procedures, which can help completing/revising the upgrade campaign specification by filling in some missing attributes as well as comparing upgrade campaign specifications from the point of view of their execution time.

(2) The SIs assignment states during the execution of the campaign, which can help completing/revising the specification of upgrade procedures, and also comparing upgrade campaign specifications from the perspective of the service outage induced by them.

(3) Probability of the scenario, which can be used to obtain the probability of the best and worst case scenarios.

The DEVS formalism is extended for evaluating upgrade campaigns. The prior art DEVS formalism can only model choreographically performed collaborations, meaning that the logic of the collaboration is distributed among collaborating entities. In the embodiments herein, some of the collaborations are orchestrated, meaning that there is a central entity orchestrating the collaboration between a set of collaborating entities. For example, AMF at any point in time may have different services to switchover to different entities with different time offsets for the next event. To make the orchestration of these events easier, the atomic DEVS model representing AMF is provided with a state-independent time-awareness. More specifically, the DEVS time function is extended in a way that not only the states have life spans but also the events. In this case, a DEVS model is imminent (or ready for a transition) if it has received an incoming event, the life span of its current state has expired, or if the lifespan of one of its events has expired. When the transition is due to the expiration of the lifespan of an event, the only reaction of the DEVS model is to output that event to its destination and go back to wait for the next transition trigger.

The simulation engine is also extended for evaluating upgrade campaigns. The aforementioned extension to the formalism was implemented in the DEVS-Suite simulator.

On one hand, the already provided APIs are extended to create output events, which include the event lifespan as an argument. Keeping in mind the backward compatibility constraints, the default value for the event lifespan is defined as zero (i.e. an event is issued right after its creation). On the other hand, the simulation mechanisms (simulators and coordinators) are extended to include the event lifespan in the calculation of the next iteration time. Note that DEVS distinguishes between external transitions (transitions triggered by the reception of an event), and internal transitions (transitions triggered by the expiration of the current state lifespan). The embodiments described herein extend the internal transition concept so that it includes the expiration of an event lifespan as well.

Figure 2:
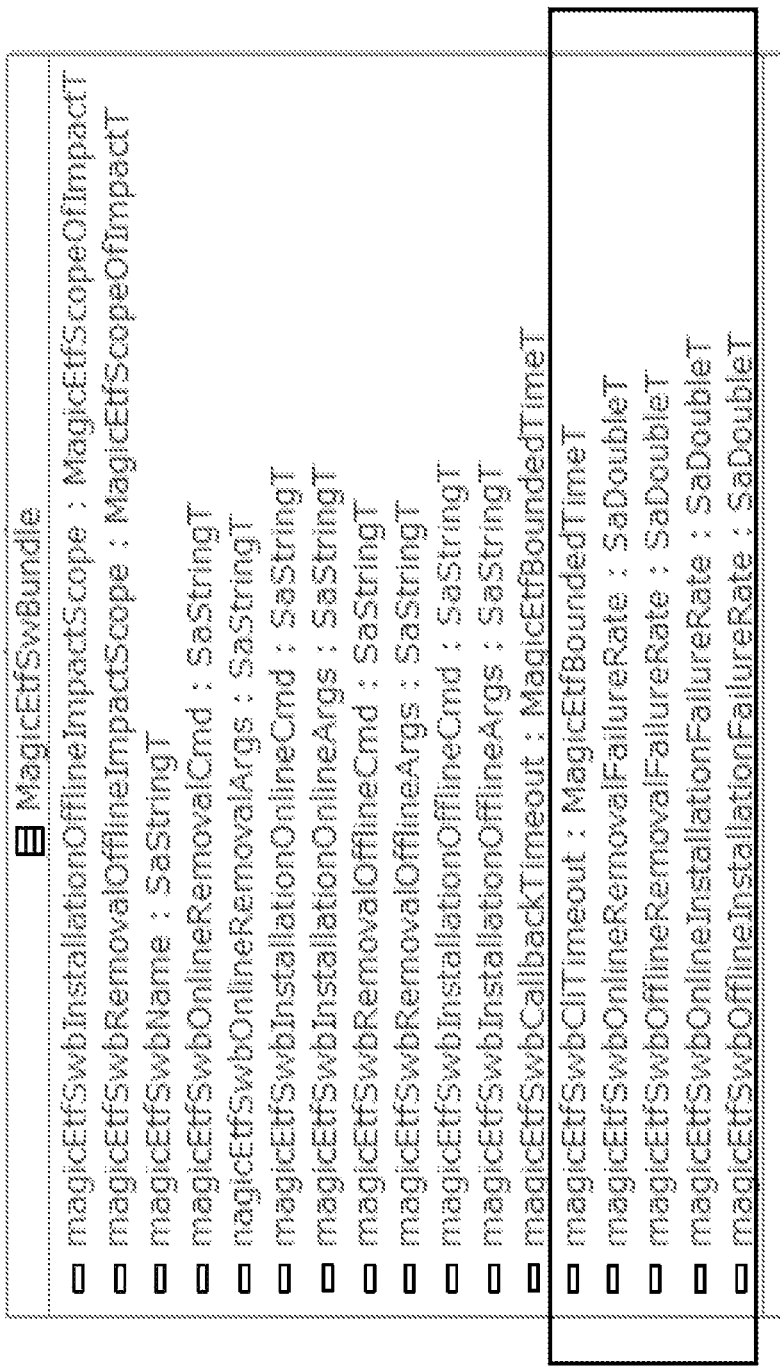
FIG. 2 illustrates an example of an extended metaclass according to one embodiment.
Figure 3:
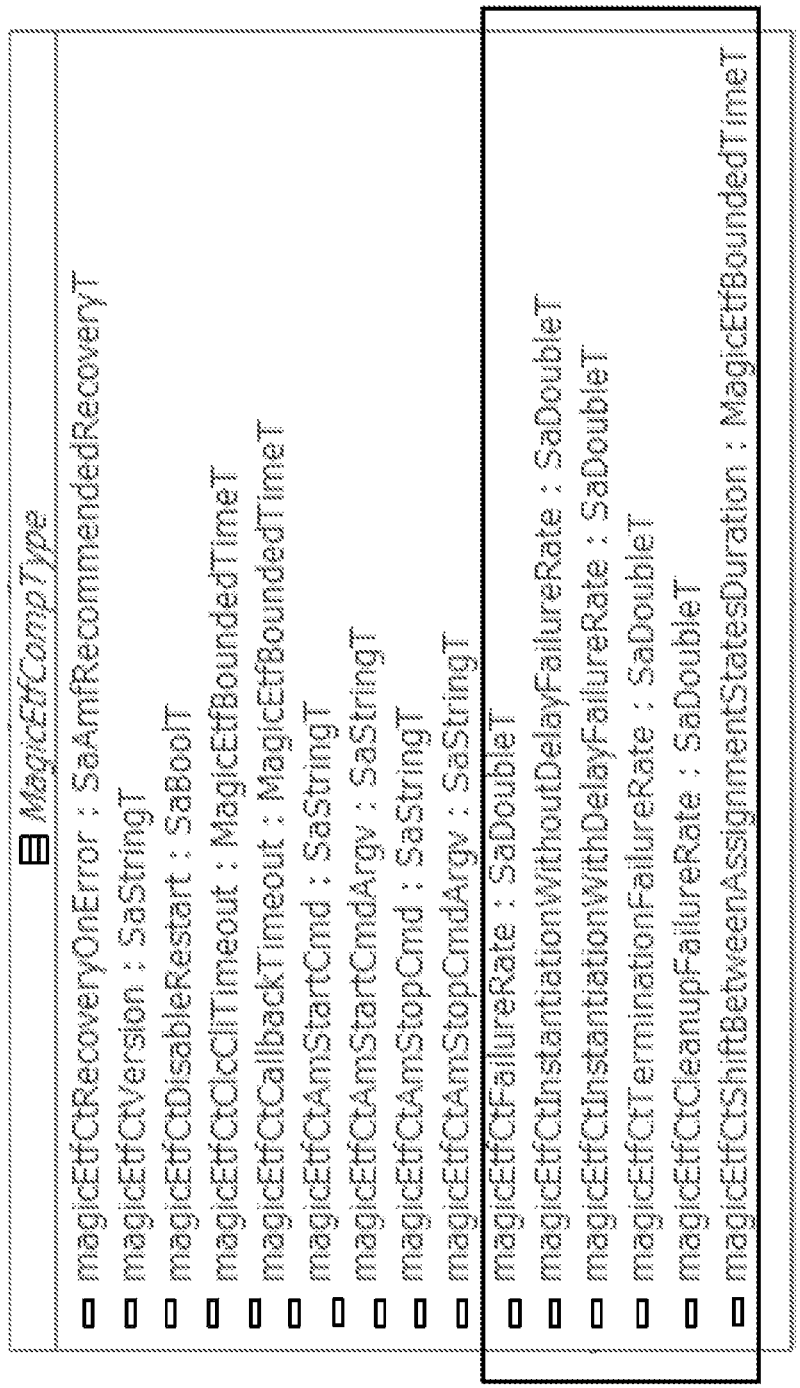
FIG. 3 illustrates an example of another extended metaclass according to one embodiment.

To perform an accurate simulation, the attributes needed for the simulation, such as failure rates and execution times, are added as part of the Upgrade Context. FIG. 2 illustrates an example of the MagicEtfSwBundle metaclass extended with attributes that describe the failure model of software operations for a software bundle and their default execution time, according to one embodiment. Similarly, FIG. 3 illustrates an example of the extension to the MagicEtfCompType metaclass to express the failure model of a component type and its lifecycle operations, according to one embodiment. Note that the time attributes in the model are bounded times, meaning that they provide a lower bound and an upper bound for the execution of the given operation. These lower and upper bounds may be used to simulate the best case and worst case execution scenarios. In one embodiment, the upper bounds may be replaced by configured timeout values.

Figure 4:
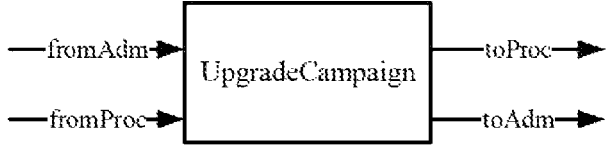
FIG. 4 illustrates objects and models involved in a simulation according to one embodiment.

Referring back to FIG. 1, the model transformation generates a DEVS coupled model from the given configuration, upgrade context and upgrade campaign specification files. This DEVS coupled model is composed of DEVS atomic models deduced by mapping the configuration and upgrade objects provided in the input files to DEVS atomic models defined in the Java Upgrade Library. This mapping is established based on the communication patterns between the different objects involved in the execution of an upgrade campaign of a given system, and is summarized in FIG. 4, which illustrates the objects involved in the simulation and their associated DEVS models according to one embodiment.

The upgrade campaign object, for instance, needs to communicate with the administrator and its procedures, which explains the Input/Output (I/O) ports associated with its DEVS model. Similarly, an upgrade procedure communicates with the campaign and the associated steps. Upgrade steps exchange events with the procedure and with AMF to perform actions on the logical entities in the AMF configuration. Thus, there is a need for an atomic DEVS model representing AMF. It was designed with an input event from and an output event to every upgrade step and every configuration object in the final DEVS model. The main responsibility of the atomic DEVS model representing AMF is interpreting and decomposing the actions performed on the configuration objects by the upgrade steps. In particular, the administrative operations issued by upgrade steps are decomposed into the associated time-constrained AMF component management operations, and for which the time constraints are given in the system configuration.

In one embodiment, the transformation may be written in Epsilon Generation Language (EGL), which is a model transformation language used for model to text transformations.

The simulation of an upgrade campaign can provide some insight into how an upgrade campaign specification applies to a given configuration. However, the simulation result may remain inconclusive when it comes to the comparison of upgrade campaign specifications. Indeed, the distribution of failures and execution times may induce significant randomness into the simulated behavior, and make the simulation results arbitrary, thus, unreliable for the purposes of comparison. If the simulation scenarios were randomly followed, one upgrade campaign specification may generate better results than another, but it is unclear whether this is because of the difference in the design, or because the random scenarios only expose a more advantageous execution path for one upgrade campaign specification than for the other. The system and method described herein compare the upgrade campaign specifications under similar circumstances in similar scenarios. Two particular cases are considered: the best case and the worst case scenarios.

The best case and worst case scenarios are defined with the consideration of three aspects related to the campaign simulation and execution:

Software operations: The execution of a software operation may succeed or fail, and does not take the same duration all the time. The upgrade context previously described captures this fact by associating with every software operation a failure rate and a bounded duration attribute specifying a lower bound and an upper bound. However, the upgrade campaign specification may constrain these operations by a default timeout, which replaces the upper bound value as SMF engages the appropriate upgrade repair mechanism if the timer expires.

AMF configuration object behavior: As stated previously, upgrade actions that involve configuration objects are decomposed into AMF component management operations, which apply differently to different component categories. Since each applicable management operations may succeed or fail, and may take different amounts of time, the upgrade context includes a failure rate and a bounded time attribute for each of these management operations for each component type. In addition, a given AMF configuration also constrains all these operations by timeouts, meaning that if an operation is taking more time than the configured timeout, AMF assumes the operation has failed and engages in recovery and repair actions, which map into AMF management operations at the component level or at the node level. In case of a failure, AMF may also reattempt some of the operations for a configured number of times before reporting a failure. All these aspects are used to define the best execution and worst execution of an operation on a given component.

Upgrade repair mechanisms: When an upgrade action fails within an upgrade step, SMF tries to undo the actions performed within the step up to the failed one, and if this undo is successful, SMF reattempts the upgrade step. The number of allowed retries is specified in the upgrade campaign specification. Accordingly, the retry time depends on the upgrade action at which the failure occurred and the number of retries permitted. If the retry number is reached, then SMF declares the upgrade campaign as failed and restores the system's original state either by rolling the upgrade campaign back or from a system backup.

As mentioned earlier, the SMF specification left some decisions to make for the SMF engine implementer. One among these is whether the SMF engine is capable of parallel execution of the upgrade procedures. The upgrade procedures of an upgrade campaign are only partially ordered and, accordingly, an implementation may execute the unordered sets in parallel or serialize them into a fully ordered execution. Since this capability depends on the given SMF engine implementation used in the given SAF system, this aspect is considered as a context parameter for the evaluation of upgrade campaign specifications. Nevertheless, this aspect influences the definition of best and worst case scenarios.

In a fully ordered execution, an SMF engine executes only one upgrade step at a time regardless of the arrangement of these steps into upgrade procedures. Each upgrade step contains a sequence of upgrade actions, some of which are performed by SMF itself, i.e. the software operations, while others are issued towards AMF and therefore decomposed into sequences of AMF management operations according to the applicable AMF configuration object behavior. Thus, the execution time is the summation of the time needed for every operation that takes place in the upgrade campaign. From an outage perspective, each upgrade action may cause some outage, but the fully ordered execution means that the upgrade actions cannot interfere with each other and cause more outage than the individual actions, as each action is started and completed one at a time.

As a result, the best case scenario for the fully ordered execution is defined as:

Time-wise: the execution time is the cumulative sum of the best execution time for each operation that takes place in the campaign execution, where the best execution time of an operation means that: the operation succeeds at the first attempt (no failure and no retries); and the operation takes the minimum time needed, which is equal to the lower bound value specified for the operation in the upgrade context (i.e. the appropriate ETF file).

Outage-wise: Since there is no interference between upgrade actions, no further consideration is necessary. The outage information is a collection of SIs that reaches the unassigned service assignment state at any time during the campaign, together with the per SI cumulative time they stay in this state. For example, assume that the outages for SI1, SI2, and SI3 are Outage(SI1), Outage(SI2), and Outage (SI3), respectively, where each Outage(SIi) (i=1, 2 or 3) is the cumulative time that SIi stays in the unassigned service assignment state. The outage for the collection of these three SIs may be expressed as a vector of three values (Outage (SI1), Outage(SI2), Outage(SI3)). Alternatively, the outage time for the collection of these three SIs may be expressed as a weighted sum as described below.

In one embodiment, the SIs are ranked in a SAF compliant system according to their importance. Typically, it is more acceptable to drop (i.e. not to provide) a lower ranking SI than a higher ranking SI. Thus, each rank may be associated with a weight such that higher ranking SIs have more weight than lower ranking SIs. This weight can be used to adjust the outage time, i.e. multiply the outage time of the SI with the weight associated with its rank. In the above example of three SIs, the outage under each scenario execution can be calculated as the sum of weighed cumulative outage time. For example, assume that SI1 is assigned to rank 1 (i.e. the most important), SI2 to rank 2, and SI3 to rank 3 (the least important), and the weights to rank 1, rank 2 and rank 3 are w1=1.5, w2=1, and w3=0.5, respectively. Then the weighted cumulative outage for the collection of three SIs is WCO=1.5×Outage(SI1)+Outage(SI2)+0.5×Outage(SI3).

In the worst case scenario, operations may fail and can be retried. Therefore, the worst case scenario takes into consideration the SMF upgrade repair mechanisms as well as the AMF recovery and repair actions. These are considered while the execution of the upgrade campaign is still successful. Accordingly, from the upgrade repair mechanisms, only the upgrade step retry option is considered. With respect to the AMF recovery and repair actions, they map to AMF management operations and can be handled at the operations level. Thus, the worst case scenario for the fully ordered execution is defined as:

Time-wise: the execution time is the cumulative sum of the execution time in the worst but successful case of execution of each upgrade step, which means that the upgrade step succeeds on the last attempt of the allowed retries, while the first attempts all fail on the upgrade action. Each failed attempt triggers AMF recovery and repair actions, which also succeed only on the last attempt of their allowed retries, i.e. the first attempts fail and the AMF recovery and repair actions are applied, which results in additional AMF management operations. For each operation that takes place as a result of such worst case execution but successful of the upgrade campaign, the worst execution time is defined as: the applicable timeout in the AMF configuration if it is an AMF management operation; or the timeout specified in the upgrade campaign specification for the software bundle if it is a software operation.

Outage-wise: the considerations for the worst case scenario are the same as for the best case scenario.

A partially ordered execution refers to an execution in which subsets of upgrade procedures are not ordered. The SMF engine can execute these subsets in any order including parallel, as there is no synchronization between them imposed by the upgrade campaign specification. A parallel execution of some upgrade procedures shortens the execution time needed for the upgrade campaign. However, the lack of synchronization between the upgrade procedures also means that they may interfere with each other: These upgrade procedures may take out of service multiple SUs of the same SG, beyond what can be tolerated in the given configuration in terms of outage. It depends on the SMF engine implementation whether it can avoid such interferences.

Accordingly, for the partially ordered execution, the best case scenario is defined as the arrangement of the upgrade steps of partially ordered upgrade procedures which induces the minimum outage. The best execution time is then calculated for this case. In the calculation of the execution time of the best case scenario, the best execution time of each operation is defined in the same way as for the fully ordered execution. The total execution time of the upgrade campaign is calculated as the cumulative sum of the maximum upgrade procedure execution time of each subset of unordered upgrade procedures, i.e. assuming that these procedures are executed simultaneously. For the simulation, the arrangement of upgrade steps is forced by the Advanced Analysis Package in FIG. 1 in a way that avoids interference as much as possible.

The worst case scenario of the partially ordered execution considers the arrangement of upgrade steps of unordered procedures (i.e. that are executed simultaneously) when their interference is maximal, i.e. when they induce the maximum outage of services (again forced by the Advanced Analysis Package). This is combined with the same time considerations as for the worst case scenario of the fully ordered execution: i.e. operations succeed on their last attempt, they take as much time as their configured timeout and the failed attempts trigger the applicable recovery and repair actions. Again for the total execution time for the worst case, the maximum worst execution time is taken for each subset of upgrade procedures executed in parallel.

Given a set of upgrade campaign specifications that can take a system from its current configuration to the same target configuration, the aforementioned simulation framework is used to evaluate them to decide which ones are more or less applicable considering some targeted acceptable outage and maintenance window.

The applicability of the scenarios discussed above depends on the capability of the SMF engine deployed in the system whose current configuration is considered in the evaluation. All SMF engines are able to execute a fully ordered upgrade campaign specification in a sequential execution mode, but some SMF engines may be incapable of a parallel execution mode of partially ordered procedures of an upgrade campaign specification.

The upgrade campaigns are evaluated from the perspective whether the goals of meeting acceptable outage and maintenance window can be achieved.

Figure 5:
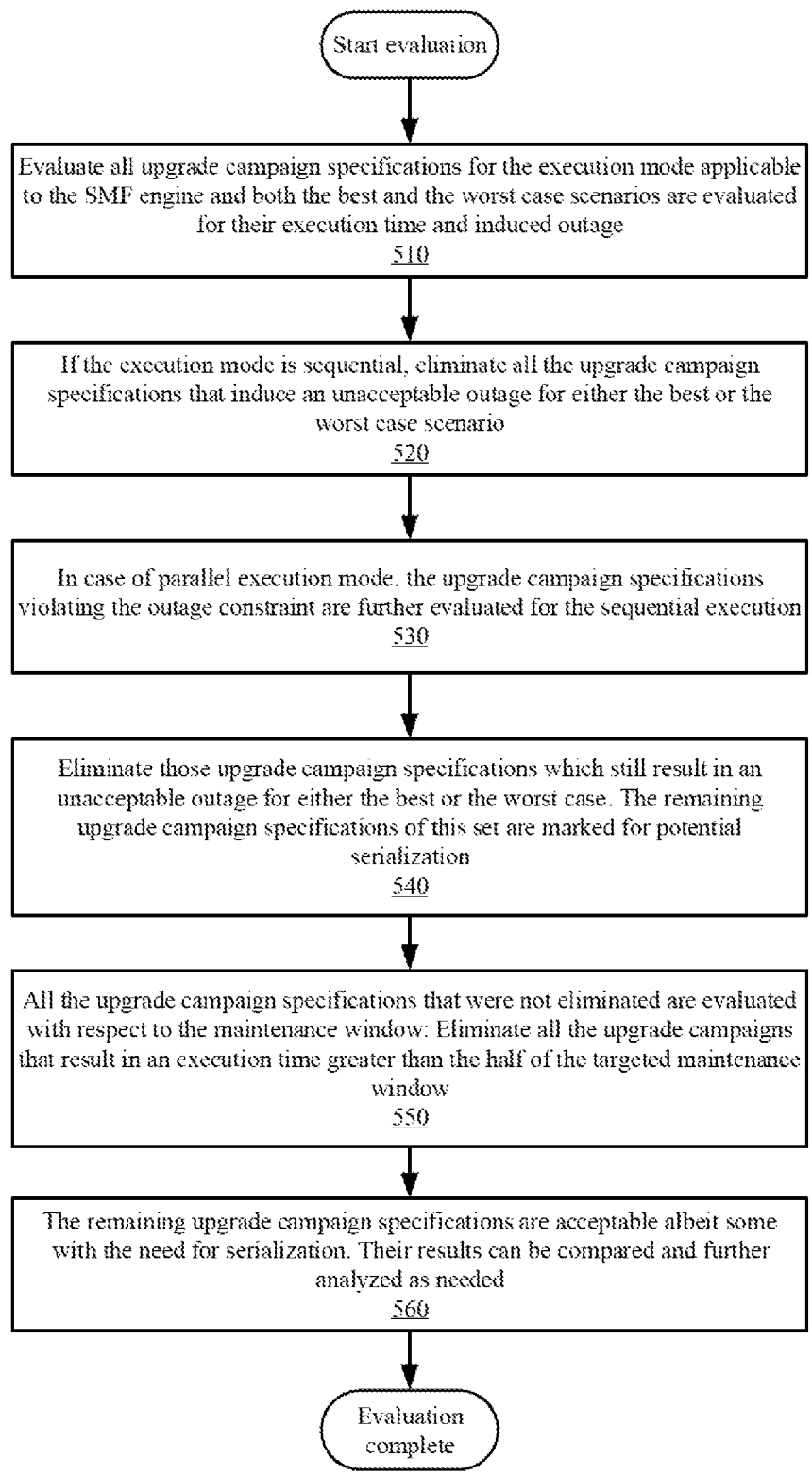
FIG. 5 illustrates a method for evaluating upgrade campaign specifications according to one embodiment.

FIG. 5 illustrates a method 500 for evaluating the upgrade campaign specifications according to one embodiment.

At step 510, all the upgrade campaign specifications are evaluated for the execution mode applicable to the SMF engine of the target system, and both the best and the worst case scenarios are evaluated for their execution time and induced outage.

At step 520, if the execution mode of the SMF engine is sequential, all the upgrade campaign specifications that induce an unacceptable outage for either the best or the worst case scenario can be safely eliminated, as there is no guarantee they can meet the outage constraint.

At step 530, in case of parallel execution mode, the upgrade campaign specifications violating the outage constraint are further evaluated for the sequential execution as it typically induces less outage. At step 540, those upgrade campaign specifications which still result in an unacceptable outage for either the best or the worst case are eliminated. The remaining upgrade campaign specifications of this set are marked for potential serialization.

At step 550, the execution times of all the remaining upgrade campaign specifications are evaluated with respect to the maintenance window. The upgrade campaign is to be completed within half of the available maintenance window to allow for a graceful rollback of the system to its original configuration, should anything go wrong unexpectedly during campaign execution. Accordingly, all the upgrade campaigns that result in an execution time greater than half of the targeted maintenance window are rejected. This criterion may be relaxed if a partial or full restoration of the system from a backup is an acceptable recovery and, therefore, can be used to shorten the rollback time.

At step 560, the upgrade campaign specifications that remain after the operation of step 550 are acceptable albeit some with the need for serialization. They can be compared and further analyzed from the perspective of their induced outages and execution times to pick the one that is the most suitable for the given system and constraints. One might choose the campaign that takes the least time in order to make better use of its maintenance window, while another might choose the one that takes the longer time because, for example, it specifies more upgrade steps retries and thereby is more reliable. The choice can also be based on the probabilities associated with the best case and the worst case scenarios, and the one having a higher probability for the best case scenario may be selected. The tradeoff of execution time for service outage and vice versa may also be a factor in the selection. The tradeoff may be considered in view of the importance of the services interrupted, the penalties associated with the interruption, and also the urgency of the upgrade. Thus, these considerations are dependent on the system to be upgraded and its services.

The evaluation of upgrade campaign specifications is useful for multiple reasons. In addition to the comparison of different upgrade campaign specifications, the evaluation also helps in meeting the availability requirements.

An evaluation based on random simulation lacks the accuracy and systematic approach due to the randomness of the simulated behaviors. Thus, there is a need for some tie-breaking scenarios. The best case scenario is a valid choice. It is useful for eliminating upgrade campaign specifications, simpler to simulate and takes less time than other scenarios, but remains inconclusive in a fair amount of cases. The use of worst case analysis is more effective and gives useful insight on the applicability of the campaign at both execution time and service outage levels as well as any opportunities to further optimize an upgrade campaign specification.

Figure 6:
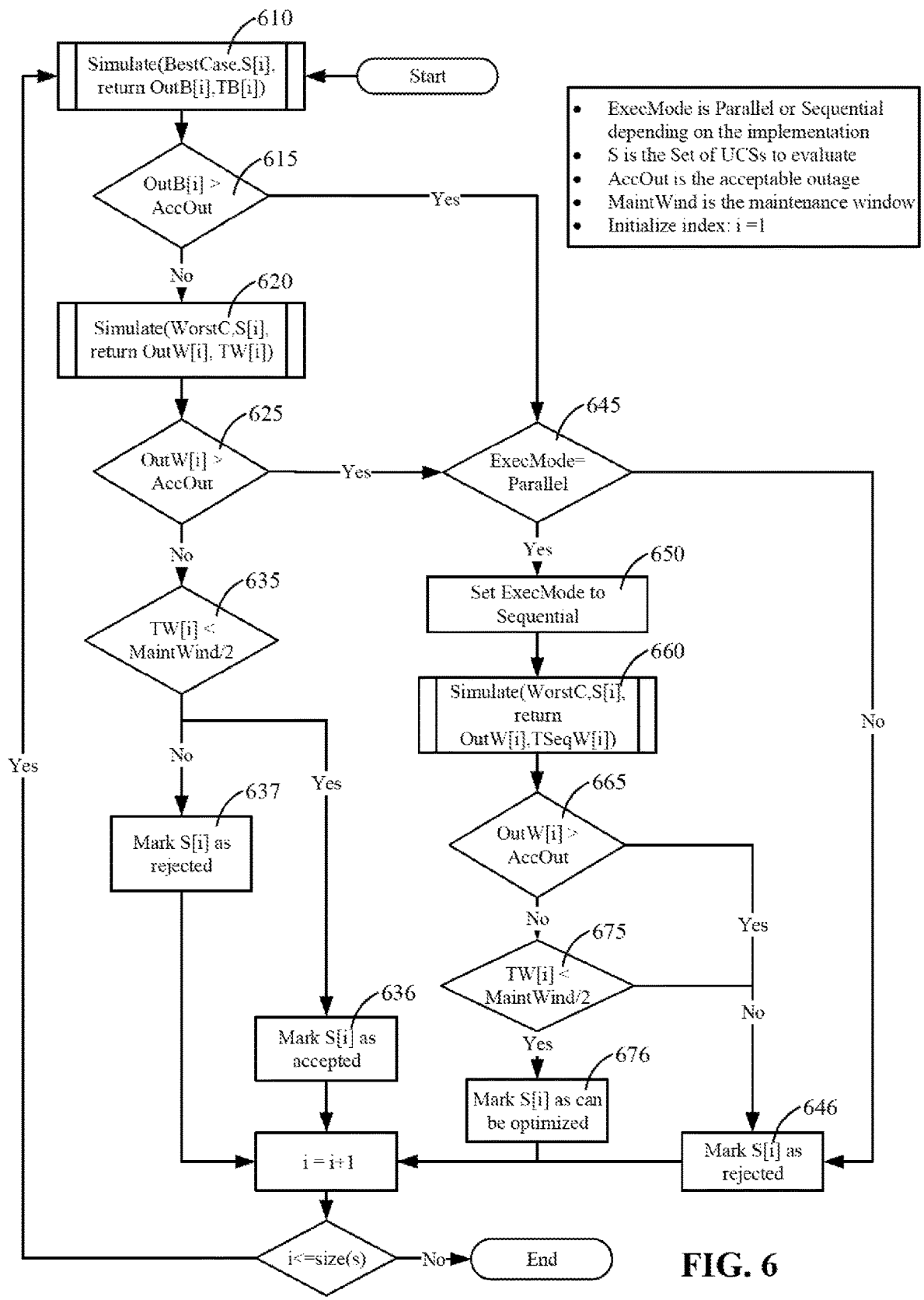
FIG. 6 illustrates a method for evaluating upgrade campaign specifications according to another embodiment.

FIG. 6 illustrates a method 600 for evaluating upgrade campaign specifications according to another embodiment. The method 600 begins with step 610, at which the system performs a simulation under the best case scenario for an i-th upgrade campaign specification (S[i]), where the index i is initialized to one. The simulation generates a simulation result including an outage (OutB[i]) and an execution time (TB [i]). As described before, the outage may be expressed as a vector of N elements, with each element of the vector (OutB[i][j]) being the per SI cumulative outage time for SI[j], and N being the number of SIs in the system configuration. Alternatively, the outage may be expressed as the WCO. The outage is compared with an outage threshold at step 615. In one embodiment, the outage threshold is the acceptable outage (AccOut), which may be a vector of N values if OutB[i] is expressed as a vector. Each of the N values in AccOut (i.e. AccOut[j]) is the acceptable outage per SI. In this case, each value of OutB[i] is compared with the corresponding value in the AccOut vector. For OutB[i] to be acceptable, each value of OutB[i] cannot be greater than the corresponding AccOut value, i.e. OutB[i][j]<AccOut 1, where j=1 . . . N. Alternatively, AccOut may be a single value if OutB[i] is a WCO, and in this case the comparison between OutB[i] and AccOut is a comparison between two values.

If the outage OutB[i] is not greater than AccOut, the method 600 proceeds to step 620, at which the system performs another simulation under the worst case scenario for S[i], and generates another simulation result including an outage (OutW[i]) and an execution time (TW[i]). If the outage OutW[i] is not greater than the AccOut at step 625, the method 600 proceeds to step 635, at which TW[i] is compared with a time threshold. In one embodiment, the time threshold is half of a maintenance window (MaintWin/2). If TW[i] is less than MaintWin/2, S[i] is marked as accepted at step 636; otherwise S[i] is marked as rejected at step 637. Then the method 600 returns to step 610 with an incremented i (e.g. i=i+1) until all of the upgrade campaign specifications have been evaluated.

If, at step 615 or step 625, either OutB[i] or OutW[i] is greater than the outage threshold AccOut, the method 600 proceeds to step 645 to determine whether the execution mode of the system is parallel. If the execution mode is not parallel, S[i] is marked as rejected at step 646. If the execution mode is parallel, the system sets the execution mode to sequential at step 650, and performs a simulation under the worst case scenario at step 660. The simulation generates a simulation result including an outage (OutW[i]) and a sequential execution time (TSeqW[i]). This outage OutW[i] is compared with AccOut at step 665. If OutW[i] is not greater than AccOut, and, at step 675, the execution time generated at step 620 TW[i] is less than MaintWin/2, S[i] is marked as "can be optimized" with serialization at step 676. If, at step 665 OutW[i] is greater than AccOut, or at step 675 TW[i] is not less than MaintWin/2, S[i] is marked as rejected at step 646. Then the method 600 returns to step 610 with an incremented i until all of the upgrade campaign specifications have been evaluated.

Figure 7:
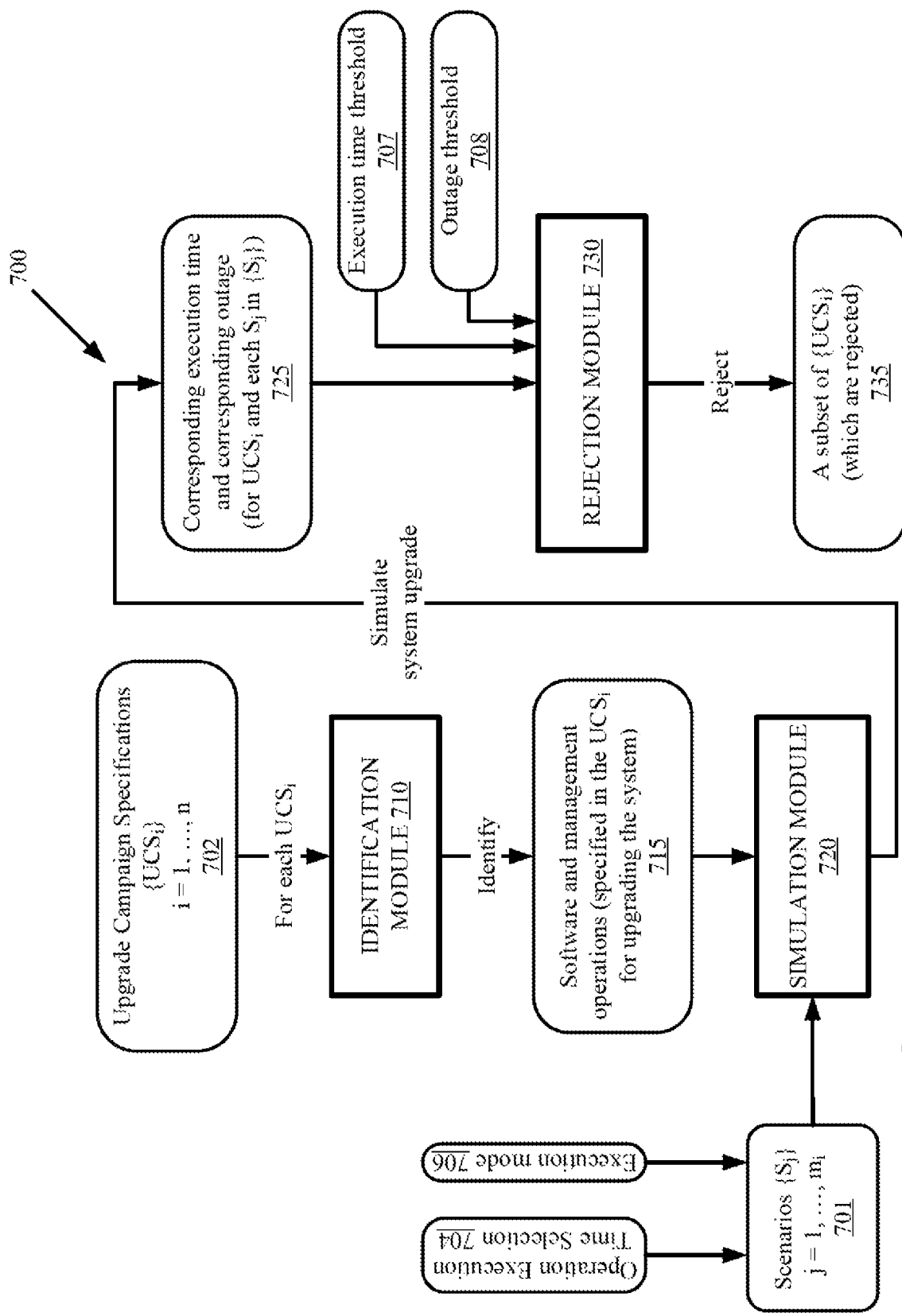
FIG. 7 is a diagram illustrating a process for selecting one or more upgrade campaign specifications according to one embodiment.

FIG. 7 is a diagram illustrating a process 700 according to one embodiment. In one embodiment, the process 700 may be performed as a method 800, shown in FIG. 8 as a flow diagram, for selecting one or more upgrade campaign specifications from a given set of upgrade campaign specifications which upgrade a system from a current configuration to a target configuration. Each block with sharp corners in FIG. 7 represents a module that performs operations, and each block with rounded corners represents input or output from a module.

Figure 8:
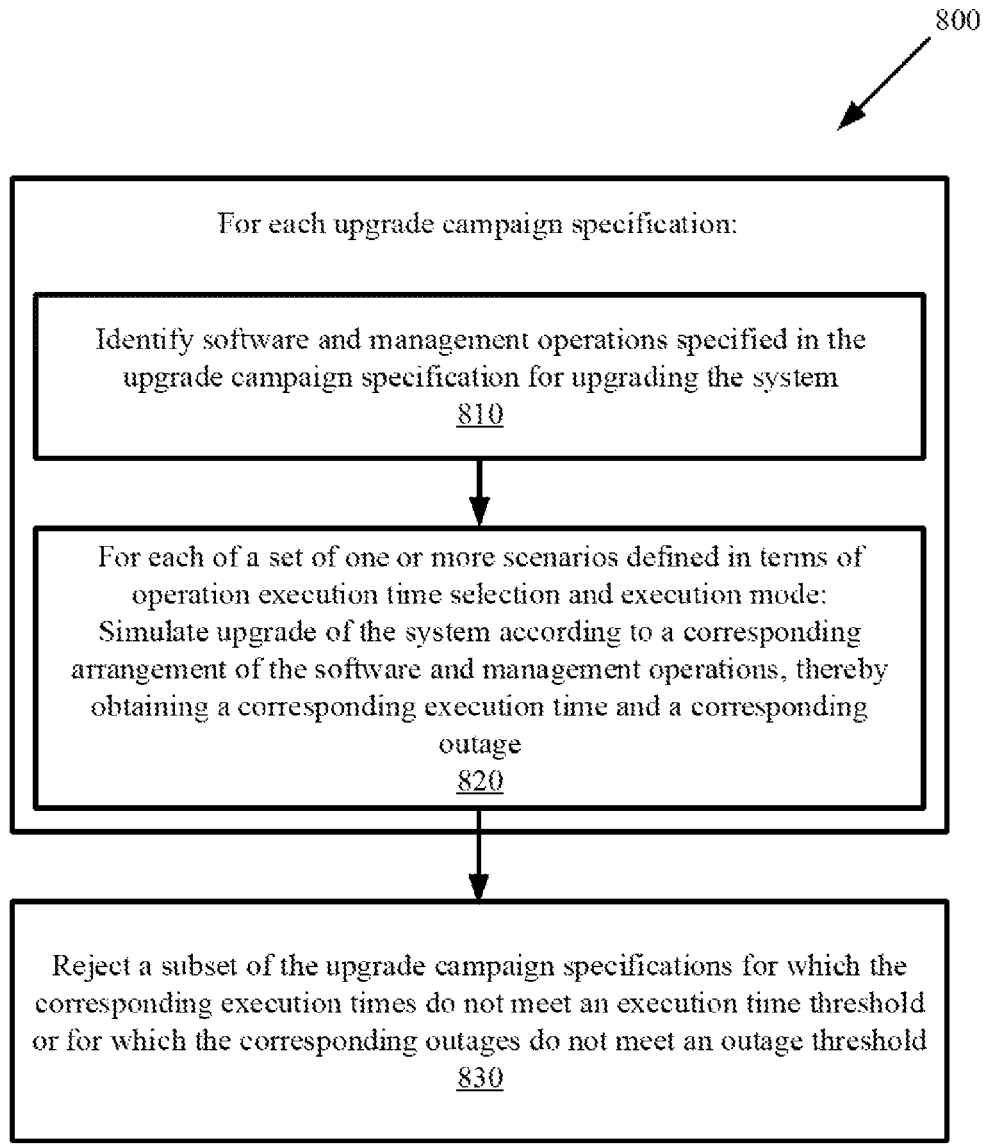
FIG. 8 is a flow diagram illustrating a method for selecting one or more upgrade campaign specifications according to one embodiment.

Referring to FIG. 7 and FIG. 8, an identification module 710 receives an input that includes a given set of upgrade campaign specifications $\{UCS_i\}$ 702, i=n. For each upgrade campaign specification (UCS), step 810 and step 820 are performed. At step 810, the identification module 710 identifies software and management operations 715 specified in the upgrade campaign specification for upgrading the system. At step 820, for each of a set of one or more scenarios ($\{S_j\}$ 701, j=1, . . . , $m_i$) defined in terms of operation execution time selection 704 and execution mode 706, the simulation module 720 simulates the upgrade of the system according to a corresponding arrangement of the software and management operations 715. In one embodiment, selecting the execution time for an operation may include selecting one or more of the following: a lower bound time value or a timeout value for executing the operation, the retry attempt at which the operation succeeds (e.g. first attempt, last allowable attempt, etc.) and the like. The simulation generates a corresponding execution time and a corresponding outage 725 for the upgrade campaign specifications $UCS_i$ and each scenario $S_i$ in $\{S_j\}$, j=1, . . . , $m_i$. In one embodiment, the number ($m_i$) of scenarios simulated by the simulation module 720 may be different for different upgrade campaign specifications. At step 830, the rejection module 730 rejects a subset of the upgrade campaign specifications 735, for which the corresponding execution times do not meet an execution time threshold 707 or for which the corresponding outages do not meet an outage threshold 708. The rejected subset of the upgrade campaign specifications 735 is an output of the process 700.

In one embodiment, the execution time and the outage, under different scenarios, may be affected by a different combination of operation execution time attributes, failure rates, whether to retry in case of a failure, and how many retries to perform for software operations and component involved in the upgrade of the system. In one embodiment, the set of scenarios 701 includes a best case scenario, in which each operation performed according to a given upgrade campaign specification succeeds at a first attempt, and executes for a time period equal to a lower bound time value specified for the operation. The given upgrade campaign specification under the best case scenario in a sequential execution mode has a minimum outage among the set of scenarios. The given upgrade campaign specification under the best case scenario in a parallel execution mode has a minimum execution time among the set of scenarios.

In one embodiment, the set of scenarios 701 includes a worst case scenario, in which each operation performed according to a given upgrade campaign specification fails until a last attempt of allowable retries, and executes for a time period equal to a timeout value specified for the operation. The given upgrade campaign specification under the worst case scenario in a sequential execution mode has a worst execution time among the set of scenarios. The given upgrade campaign specification under the worst case scenario in a parallel execution mode has a maximum outage among the set of scenarios.

Figure 9:
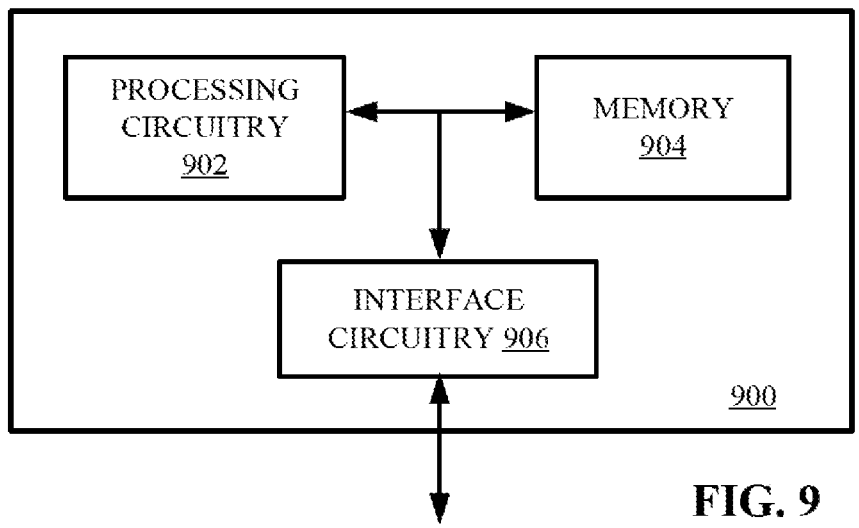
FIG. 9 is a block diagram of a network node according to one embodiment.

FIG. 9 is a block diagram illustrating a network node 900 according to an embodiment. In one embodiment, the network node 900 may be a server in an operator network or in a data center. The network node 900 includes circuitry including processing circuitry 902, a memory or instruction repository 904 and interface circuitry 906. The interface circuitry 906 can include at least one input port and at least one output port. The memory 904 contains instructions executable by the processing circuitry 902 whereby the network node 900 is operable to perform the various embodiments as described herein, including the methods 500, 600 and 800 of FIGS. 5, 6 and 8, respectively.

Figure 10:
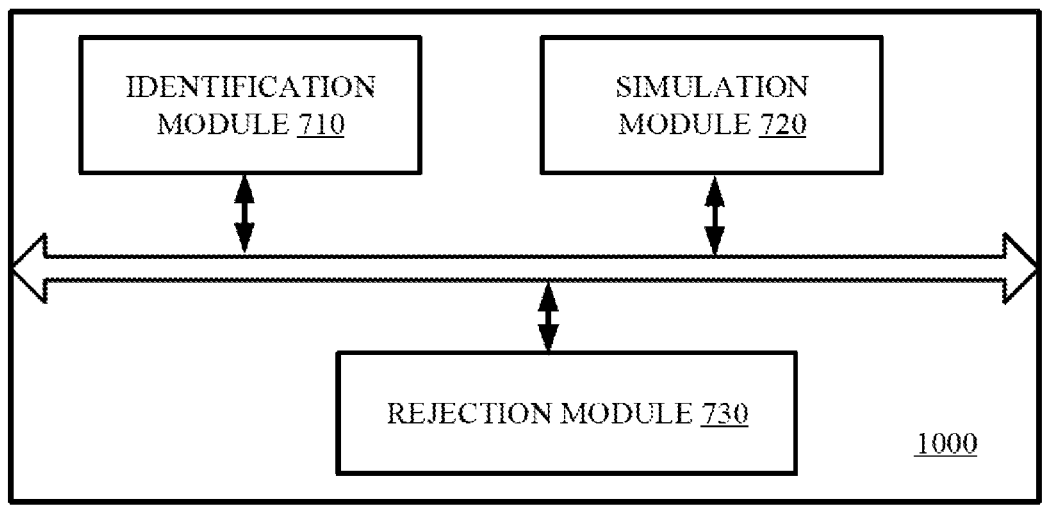
FIG. 10 is a block diagram of another network node according to one embodiment.

FIG. 10 is a block diagram of an example network node 1000 that includes a plurality of modules. In one embodiment, the network node 1000 may be a server in an operator network or in a data center. Referring also to FIG. 7, the network node 1000 includes the identification module 710 adapted or operative to identify, for each upgrade campaign specification, software and management operations specified in the upgrade campaign specification for upgrading the system. The network node 1000 also includes a simulation module 720 adapted or operative to simulate, for each upgrade campaign specification and for each of a set of one or more scenarios defined in terms of operation execution time selection and execution mode, upgrade of the system according to a corresponding arrangement of the software and management operations, thereby obtaining a corresponding execution time and a corresponding outage. The network node 1000 also includes a rejection module 730 adapted or operative to reject a subset of the upgrade campaign specifications for which the corresponding execution times do not meet an execution time threshold or for which the corresponding outages do not meet an outage threshold. The network node 1000 can be configured to perform the various embodiments as have been described herein.

Figure 11:
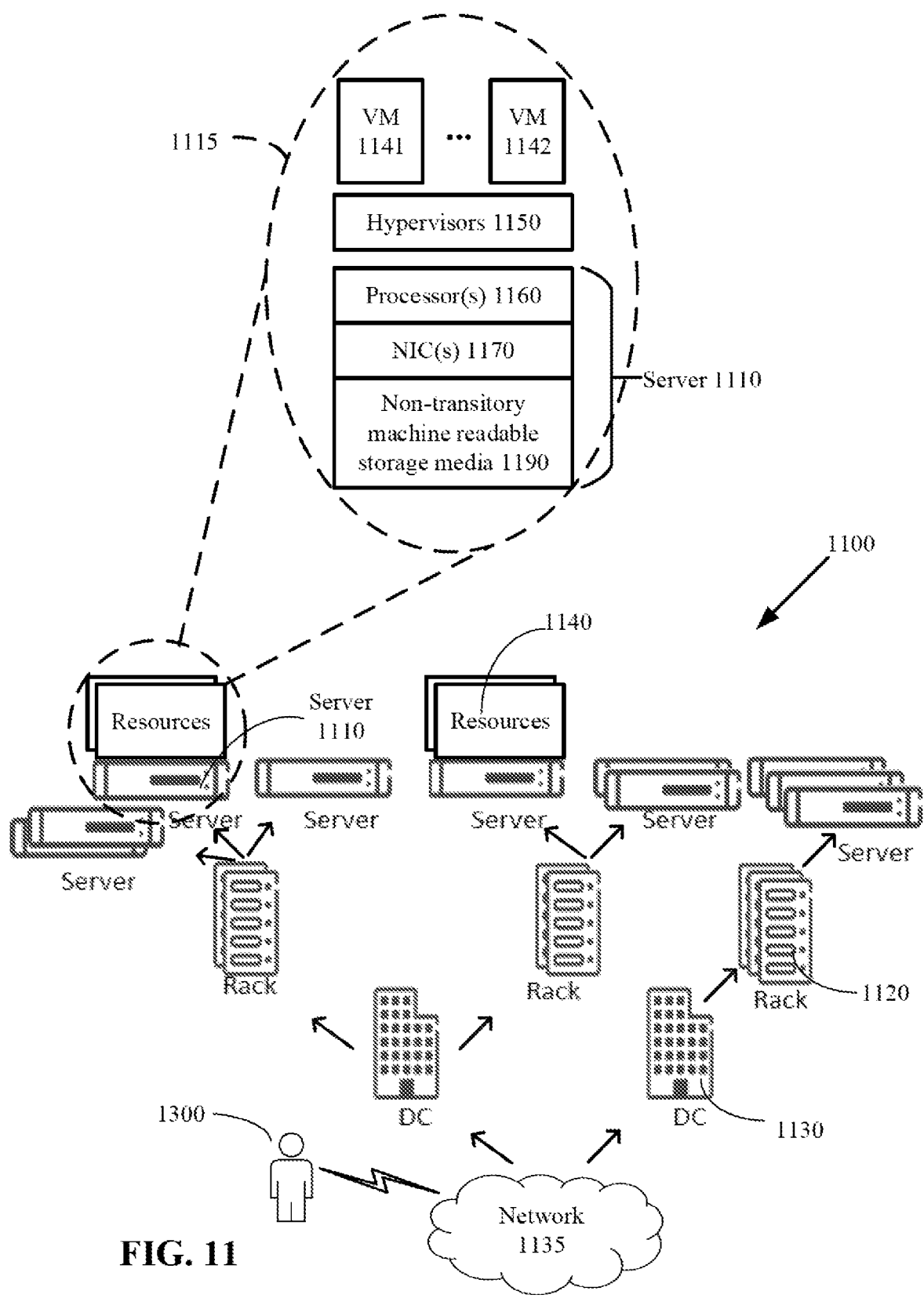
FIG. 11 is an architectural overview of a cloud computing environment according to one embodiment.

FIG. 11 is an architectural overview of a cloud computing environment 1100 that comprises a hierarchy of a cloud computing entities. The cloud computing environment 1100 can include a number of different data centers (DCs) 1130 at different geographic sites connected over a network 1135. Each data center 1130 site comprises a number of racks 1120, each rack 1120 comprises a number of servers 1110. It is understood that in alternative embodiments a cloud computing environment may include any number of data centers, racks and servers. A set of the servers 1110 may be selected to host resources 1140. In one embodiment, the servers 1110 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to virtual machines (VMs), containers and their contained components share the same host OS instance and therefore create less overhead.

Further details of the server 1110 and its resources 1140 are shown within a dotted circle 1115 of FIG. 11, according to one embodiment. The cloud computing environment 1100 comprises a general-purpose network device (e.g. server 1110), which includes hardware comprising a set of one or more processor(s) 1160, which can be commercial off-the-shelf (COTS) processors, dedicated Application Specific Integrated Circuits (ASICs), or any other type of processing circuit including digital or analog hardware components or special purpose processors, and network interface controller (s) 1170 (NICs), also known as network interface cards, as well as non-transitory machine readable storage media 1190 having stored therein software and/or instructions executable by the processor(s) 1160.

During operation, the processor(s) 1160 execute the software to instantiate a hypervisor 1150 and one or more VMs 1141, 1142 that are run by the hypervisor 1150. The hypervisor 1150 and VMs 1141, 1142 are virtual resources, which may run node instances in this embodiment. In one embodiment, the node instance may be implemented on one or more of the VMs 1141, 1142 that run on the hypervisor 1150 to perform the various embodiments as have been described herein. In one embodiment, the node instance may be instantiated as a network node performing the various embodiments as described herein.

In an embodiment, the node instance instantiation can be initiated by a user 1300 or by a machine in different manners. For example, the user 1300 can input a command, e.g., by clicking a button, through a user interface to initiate the instantiation of the node instance. The user 1300 can alternatively type a command on a command line or on another similar interface. The user 1300 can otherwise provide instructions through a user interface or by email, messaging or phone to a network or cloud administrator, to initiate the instantiation of the node instance.

Embodiments may be represented as a software product stored in a machine-readable medium (such as the non-transitory machine readable storage media 1190, also referred to as a computer-readable medium, a processor-readable medium, or a computer usable medium having a computer readable program code embodied therein). The non-transitory machine-readable medium 1190 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

What is claimed is:

1. A method for selecting one or more upgrade campaign specifications from a given set of upgrade campaign specifications which upgrade a system from a current configuration to a target configuration, comprising:

(a) for each given upgrade campaign specification of the given set of upgrade campaign specifications:

identifying software and management operations specified in the given upgrade campaign specification for upgrading the system; and for each of a set of one or more scenarios defined in terms of operation execution time selection and execution mode, simulating upgrade of the system according to a corresponding arrangement of the software and management operations, thereby obtaining a corresponding execution time and a corresponding outage, wherein the set of scenarios includes a best case scenario and a worst case scenario, wherein in the best case scenario each operation performed according to the given upgrade campaign specification succeeds at a first attempt, and wherein each operation executes for a time period equal to a lower bound time value specified for the operation and in the worst case scenario each operation performed according to the given upgrade campaign specification fails until a last attempt of allowable retries, and wherein each operation executes for a time period equal to a timeout value specified for the operation; and (b) rejecting a subset of the given set of upgrade campaign specifications for which the corresponding execution times do not meet an execution time threshold or for which the corresponding outages do not meet an outage threshold.

2. The method of claim 1, wherein, when executed in a sequential execution mode, the given upgrade campaign specification under the best case scenario has a minimum outage among the set of scenarios.

3. The method of claim 1, wherein, when executed in a parallel execution mode, the given upgrade campaign specification under the best case scenario has a minimum execution time among the set of scenarios.

4. The method of claim 1, wherein, when executed in a sequential execution mode, the given upgrade campaign specification under the worst case scenario has a worst execution time among the set of scenarios.

5. The method of claim 1, wherein, when executed in a parallel execution mode, the given upgrade campaign specification under the worst case scenario has a maximum outage among the set of scenarios.

6. The method according to claim 1, wherein the corresponding execution time and the corresponding outage, under different scenarios, are affected by a different combination of: operation execution time attributes, failure rates, whether retries are allowed in case of a failure, and a number of allowed retries for software operations and components involved in upgrade of the system.

7. The method according to claim 1, wherein the corresponding outage of the given upgrade campaign specification is described by a list of service instances which reach an unassigned service assignment state, together with a per-service-instance cumulative time that each service instance stays in the unassigned service assignment state.

8. The method according to claim 1, wherein calculating the corresponding execution time and the corresponding outage further comprises:

generating a probability that a given scenario occurs when calculating the corresponding execution time and the corresponding outage for the given scenario.

9. The method of claim 1, further comprising:

rejecting a first subset of the given set of upgrade campaign specifications, for which the corresponding outage is greater than the outage threshold when each of the upgrade campaign specifications in the first subset is executed in a sequential execution mode under at least one of the scenarios;

rejecting a second subset of the given set of upgrade campaign specifications, for which the corresponding execution time is greater than the execution time threshold when each of the upgrade campaign specifications in the second subset is executed under a worst case scenario; and selecting one of the upgrade campaign specifications of the given set of upgrade campaign specifications that are neither in the first subset nor the second subset.

10. The method of claim 9 further comprising:

marking a third subset of the given set of upgrade campaign specifications for serialization, the third subset having no overlap with the first subset and the second subset, wherein each upgrade campaign specification in the third subset, when executed in a parallel execution mode under at least one of the scenarios, induces the corresponding outage greater than the outage threshold, and, when executed in the sequential execution mode under each of the set of scenarios, induces the corresponding outage not greater than the outage threshold.

11. A network node comprising processing circuitry and memory, said memory containing instructions executable by said processing circuitry to select one or more upgrade campaign specifications from a given set of upgrade campaign specifications which upgrade a system from a current configuration to a target configuration, whereby said network node is operative to:

(a) for each given upgrade campaign specification of the given set of upgrade campaign specifications:

identify software and management operations specified in the given upgrade campaign specification for upgrading the system; and for each of a set of one or more scenarios defined in terms of operation execution time selection and execution mode, simulate upgrade of the system according to a corresponding arrangement of the software and management operations, thereby obtaining a corresponding execution time and a corresponding outage, wherein the set of scenarios includes a best case scenario and a worst case scenario, wherein in the best case scenario each operation performed according to the given upgrade campaign specification succeeds at a first attempt, and wherein each operation executes for a time period equal to a lower bound time value specified for the operation and in the worst case scenario each operation performed according to the given upgrade campaign specification fails until a last attempt of allowable retries, and wherein each operation executes for a time period equal to a timeout value specified for the operation; and (b) reject a subset of the given set of upgrade campaign specifications for which the corresponding execution times do not meet an execution time threshold or for which the corresponding outages do not meet an outage threshold.

12. The network node of claim 11, wherein, when executed in a sequential execution mode, the given upgrade campaign specification under the best case scenario has a minimum outage among the set of scenarios.

13. The network node of claim 11, wherein, when executed in a parallel execution mode, the given upgrade campaign specification under the best case scenario has a minimum execution time among the set of scenarios.

14. The network node of claim 11, wherein, when executed in a sequential execution mode, the given upgrade campaign specification under the worst case scenario has a worst execution time among the set of scenarios.

15. The network node of claim 11, wherein, when executed in a parallel execution mode, the given upgrade campaign specification under the worst case scenario has a maximum outage among the set of scenarios.

16. The network node according to claim 11, wherein the corresponding execution time and the corresponding outage, under different scenarios, are affected by a different combination of: operation execution time attributes, failure rates, whether retries are allowed in case of a failure, and a number of allowed retries for software operations and components involved in upgrade of the system.

17. The network node according to claim 11, wherein the corresponding outage of the given upgrade campaign specification is described by a list of service instances which reach an unassigned service assignment state, together with a per-service-instance cumulative time that each service instance stays in the unassigned service assignment state.

18. The network according to claim 11, wherein the network node is further operative to generate a probability that a given scenario occurs when calculating the corresponding execution time and the corresponding outage for the given scenario.

19. The network node of claim 11, wherein the network node is further operative to:

reject a first subset of the given set of upgrade campaign specifications, for which the corresponding outage is greater than the outage threshold when each of the upgrade campaign specifications in the first subset is executed in a sequential execution mode under at least one of the scenarios;

reject a second subset of the given set of upgrade campaign specifications, for which the corresponding execution time is greater than the execution time threshold when each of the upgrade campaign specifications in the second subset is executed under a worst case scenario; and select one of the upgrade campaign specifications of the given set of upgrade campaign specifications that are neither in the first subset nor the second subset.

20. The network node of claim 19, wherein the network node is further operative to mark a third subset of the given set of upgrade campaign specifications for serialization, the third subset having no overlap with the first subset and the second subset, wherein each upgrade campaign specification in the third subset when executed in a parallel execution mode under at least one of the scenarios induces the corresponding outage greater than the outage threshold, and when executed in the sequential execution mode under each of the set of scenarios induces the corresponding outage not greater than the outage threshold.

* * * * *